US012673738B2

(12) United States Patent
Lee

(10) Patent No.: US 12,673,738 B2
(45) Date of Patent: Jul. 7, 2026

(54) WATERPROOF INTERNAL WIRING STRUCTURE FOR BICYCLE HEADSET

(71) Applicant: GLORY WHEEL ENTERPRISE CO., LTD., Taichung City (TW)

(72) Inventor: Chien Hao Lee, Taichung City (TW)

(73) Assignee: GLORY WHEEL ENTERPRISE CO., LTD., Taichung City (TW)

( * ) Notice: Subject to any disclaimer, the term of this patent is extended or adjusted under 35 U.S.C. 154(b) by 355 days.

(21) Appl. No.: 18/437,367

(22) Filed: Feb. 9, 2024

(65) Prior Publication Data

US 2025/0256799 A1 Aug. 14, 2025

(51) Int. Cl.
B62J 11/19 (2020.01)
B62K 19/32 (2006.01)

(52) U.S. Cl.
CPC .............. B62J 11/19 (2020.02); B62K 19/32 (2013.01)

(58) Field of Classification Search
CPC ........... B62J 11/19; B62J 11/13; B62K 19/32; B62K 21/18
See application file for complete search history.

(56) References Cited

U.S. PATENT DOCUMENTS

2018/0170471 A1* 6/2018 Lin ......................... B62K 21/18
2022/0204118 A1* 6/2022 King ........................ B62J 11/13

FOREIGN PATENT DOCUMENTS

| | | | | | |
|---|---|---|---|---|---|
| CN | 101168376 A | * | 4/2008 | .............. | F16B 21/18 |
| CN | 203211458 U | * | 9/2013 | | |
| CN | 204137268 U | * | 2/2015 | | |
| CN | 112977703 A | * | 6/2021 | ............. | B62K 21/18 |
| CN | 216916133 U | * | 7/2022 | | |
| CN | 120096718 A | * | 6/2025 | ............. | B62J 11/19 |
| DE | 102023114374 A1 | * | 1/2024 | ............. | B62J 11/10 |
| JP | 3252633 U | * | 8/2025 | ............. | H02K 5/225 |
| TW | M476732 U | * | 4/2014 | ............. | B62K 19/32 |
| TW | I704072 B | * | 9/2020 | ............. | B62K 21/06 |

* cited by examiner

*Primary Examiner* — Drew J Brown
(74) *Attorney, Agent, or Firm* — MUNCY, GEISSLER, OLDS & LOWE, P.C.

(57) ABSTRACT

A waterproof internal wiring structure for a bicycle headset includes an upper headset assembly installed between a steerer tube of a front fork tube and a head tube. The upper headset assembly includes of a bearing, a seat, and a ring axially mounted. A sealing member and a cover are stacked on the ring. The sealing member is in a closed annular shape and includes wire holes for the passage of wires. The wire holes have a resilient rib radially from an inner periphery thereof to form a central inner hole. An inner diameter of the central inner hole is smaller than that of the wires. When the wires pass through the central inner hole, the resilient rib resiliently bends and adheres to an outer periphery of the wires to seal a gap between the wire hole and the wires to prevent water or debris from entering the head tube.

7 Claims, 7 Drawing Sheets

WATERPROOF INTERNAL WIRING STRUCTURE FOR BICYCLE HEADSET

FIELD OF THE INVENTION

The present invention relates to a waterproof internal wiring structure for a bicycle headset securing device to conceal wires in the head tube and provides improved waterproofing between the wires and the head tube.

BACKGROUND OF THE INVENTION

The known way of arrangement of wires and cables for controlling bicycle functions is routed along the exterior of the bicycle frame. However, to avoid the unsightly appearance of exposed wires, they are now concealed within the internal space of the bicycle frame. For instance, they may pass through handlebar stems, headsets, and front forks to reach the interior of the frame. Taiwan Patent No. M619006 discloses an "Internal-wiring headset cup structure improvement" and comprises a front fork, a head tube, a bearing, a bearing seat with a preset position having a through hole, and a cover with a central hole. The steerer tube of the front fork is threaded through the head tube, and the bearing is connected to the bearing seat. The bearing and the bearing seat are then connected to the top of the head tube. The cover is placed over the bearing and bearing seat. This configuration allows the brake or gear wires to enter the bearing seat through the central hole in the cover, then proceed into the head tube, so that the wires remain concealed and protected within the frame to avoid clutter and provide wire protection.

Another Taiwan Patent No. M M497135 discloses a "Headset with wire bundling structure" comprises two bowl seats positioned at the ends of the front tube of a bicycle to secure brake wires. Each bowl seat consists of a bowl piece, a bearing assembly placed between the bowl piece and the bicycle's front fork, and a cover used to secure the bearing assembly inside the bowl piece. The bowl piece has a connecting portion and a socket portion that is conjoined internally with the connecting portion so as to form a space formed between the socket portion and the connecting portion. The socket portion is designed to fit with the front tube of the bicycle frame, and the connecting portion has an annular wall structure which includes an inner surface, an outer surface, and a port. The inner surface includes a rib, allowing the bearing assembly to pass through the cover and be secured between the rib and the port. Additionally, the connecting portion has multiple through holes between the rib and the socket portion, enabling brake wires to enter the front tube for bundling.

However, it is noted that the wires exit the head tube through a central hole in the cover, where the diameter of the central hole of the cover is much larger than the wire diameter. This results in a large space between the wire and the central hole, lacking waterproof design, such that water can leaks into the head tube and potentially causing rust and damage to internal components, thereby reducing the overall lifespan.

The present invention intends to provide a waterproof internal wiring structure for a bicycle headset to conceal wires in the head tube and provides improved waterproofing between the wires and the head tube.

SUMMARY OF THE INVENTION

The present invention relates to a waterproof internal wiring structure for a bicycle headset, and comprises an upper headset assembly connected between an outer side of a steerer tube of a front fork and an inner side of an upper end of a head tube. The upper headset assembly comprises a bearing located at the inner side of the upper end of the head tube. A seat is positioned on the bearing and includes a first hole. Multiple elongated holes are defined through the seat and located around the first hole. A C-shaped ring is located in the first hole. The steerer tube of the front fork tube extends through the ring. A sealing member which is a closed annular shape and has a central hole. Multiple protrusions are formed on a top surface of the sealing member and located around the second hole. Each protrusion includes multiple wire holes which communicate with the elongated holes of the seat. Each wire hole has a resilient rib extending radially from an inner periphery thereof and forming a central inner hole. A diameter of the central inner hole is sized such that the resilient rib matches with a wire passing through the central inner hole to prevent water from entering the head tube.

A cover is positioned at the upper end of the head tube and mounted to the sealing member. The cover has a third hole, and the steerer tube of front fork tube passes through the third hole. The cover includes multiple passages with which the protrusions of the sealing member are engaged. The passages communicate with the wire holes and the elongate holes. An O-ring is engaged with the third central hole of the cover and contacts the steerer tube of the front fork.

The primary object of the present invention is to provide a waterproof internal wiring structure in an upper headset assembly of a bicycle. The structure includes a sealing member incorporated with a cover. The sealing member includes a resilient rib that can resiliently fill the gap between the wires and the inner surface of the wire holes so as to effectively prevent water and debris from infiltrating the channel space within the head tube.

Therefore, the present invention provides the following benefits:

The sealing member that is located beneath the cover, and the sealing member includes a resilient rib extending radially within the wire holes, and the diameter of the central inner hole formed by the resilient rib is smaller than the diameter of the wires. When the wires pass through the central inner hole formed by the resilient rib, the resilient rib bends and forms a closer contact with the outer periphery of the wires. This arrangement fills and seals the gap between the wires and the wire holes, preventing water and debris from easily infiltrating the head tube through the wire holes. This effectively increases the lifespan of the upper headset assembly within the head tube, making the product more stable and practically useful.

The diameter of the central inner hole formed by the resilient rib of the present invention is significantly smaller than that of wires. Therefore, wires of different diameters can, within an allowable range, cause the resilient rib to elastically bend and adhere to the outer periphery of the wires.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
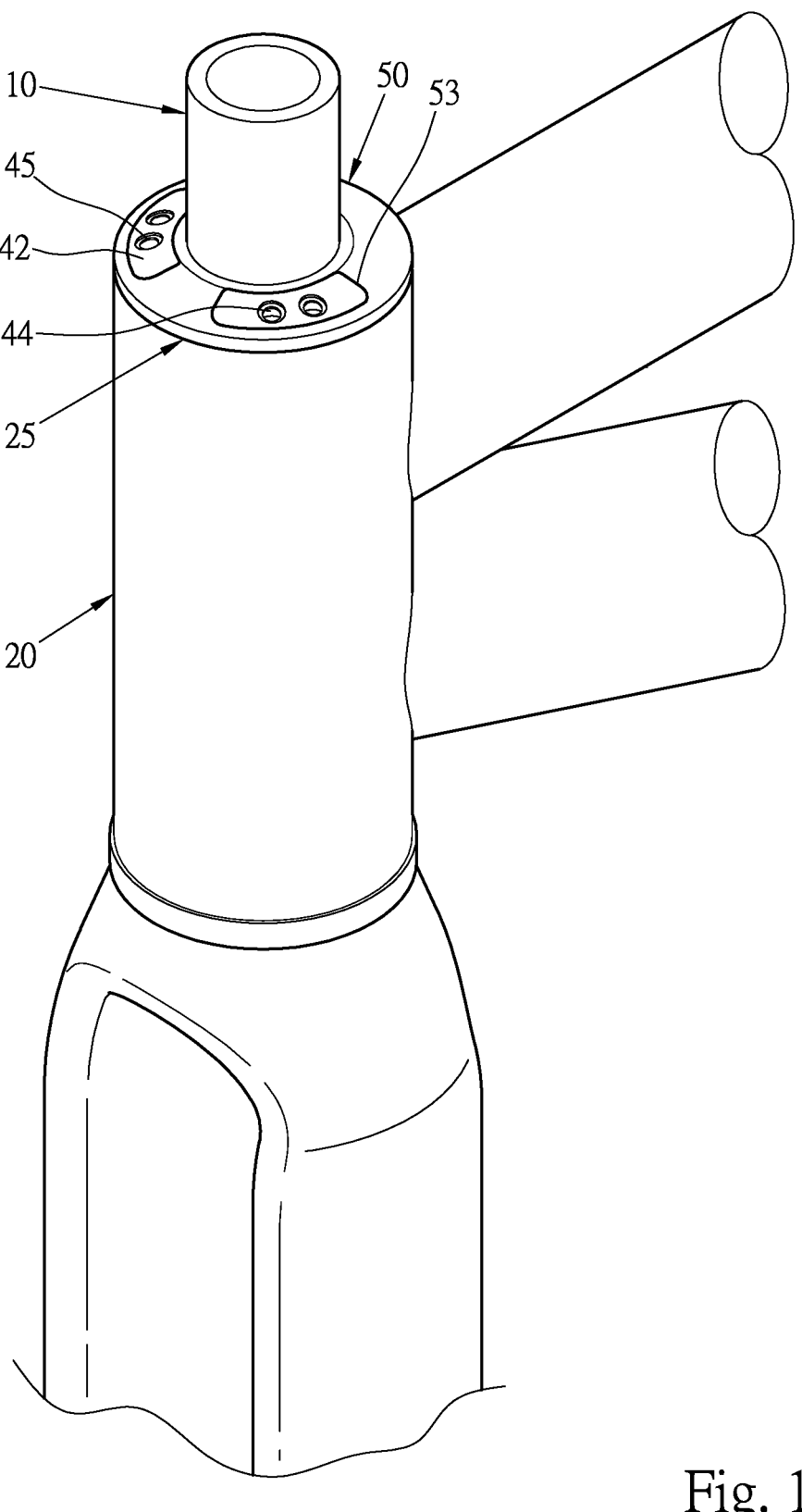
FIG. 1 shows the waterproof internal wiring structure for a bicycle headset of the present invention installed to a head tube of a bicycle.
Figure 2:
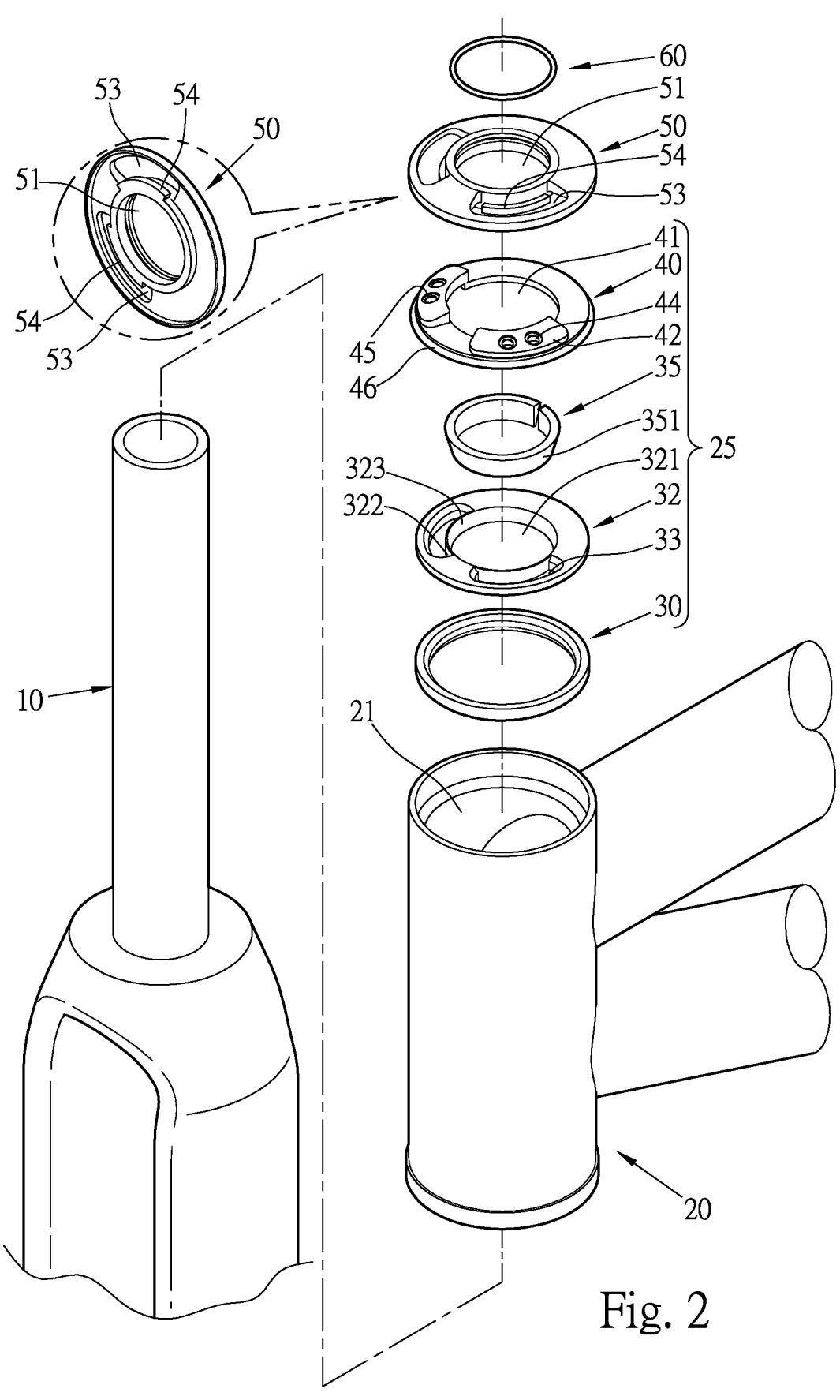
FIG. 2 is an exploded view to show the waterproof internal wiring structure for a bicycle headset of the present invention.

Referring to FIGS. 1 and 2, the waterproof internal wiring structure for a bicycle headset of the present invention comprises head tube 20, and an upper headset assembly 25 and a lower headset assembly are respectively connected to two ends of the head tube 20. The present invention is related to the upper headset assembly 25 that is connected between an outer side of a steerer tube of a front fork 10 and an inner side of an upper end of a head tube 20. The head tube 20 includes a room 21 defined in the upper end thereof, and the upper headset assembly 25 is located in the room 21. The upper headset assembly 25 comprises a bearing 30 located at the inner side of the upper end of the head tube 20, a seat 32, a C-shaped ring 35, a sealing member 40 and a cover 50.

As shown in FIGS. 2 to 5, the bearing 30 is installed to the inner periphery of the room 21 and the annular seat 32 is mounted to the bearing 30. The seat 32 includes a first hole 321 so that the steerer tube extends through the first hole 321. The seat 32 includes a lip 322 extending downward along a periphery of the first hole 321 of seat 32. The bearing 30 is mounted to the lip 322. An inner periphery of the first hole 321 and an inner periphery of the lip 322 form a first conical surface 323. Multiple elongated holes 33 are defined through the seat 32 and located around the first hole 321 through which the steerer tube extends. The ring 35 is located in the first hole 321. An outer periphery of the ring 35 includes a second conical surface 351 which is matched with the first conical surface 323. The ring 35 is reduced its inner diameter by the first and second conical surfaces 323, 351. The steerer tube of the front fork tube 10 rotatably extends through the ring 35.

Figure 3:
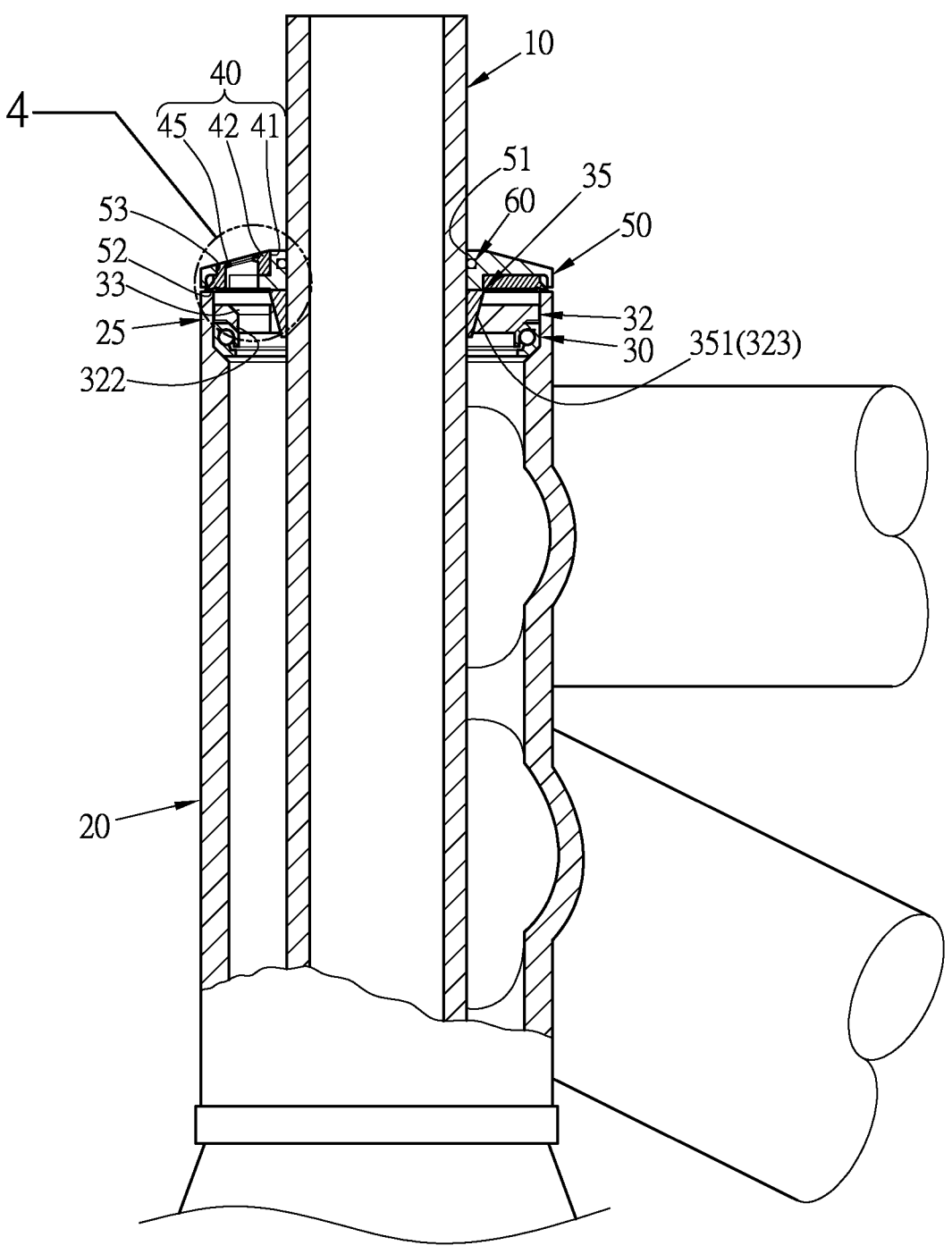
FIG. 3 is a partial cross sectional view of the waterproof internal wiring structure for a bicycle headset of the present invention in FIG. 1.
Figure 4:
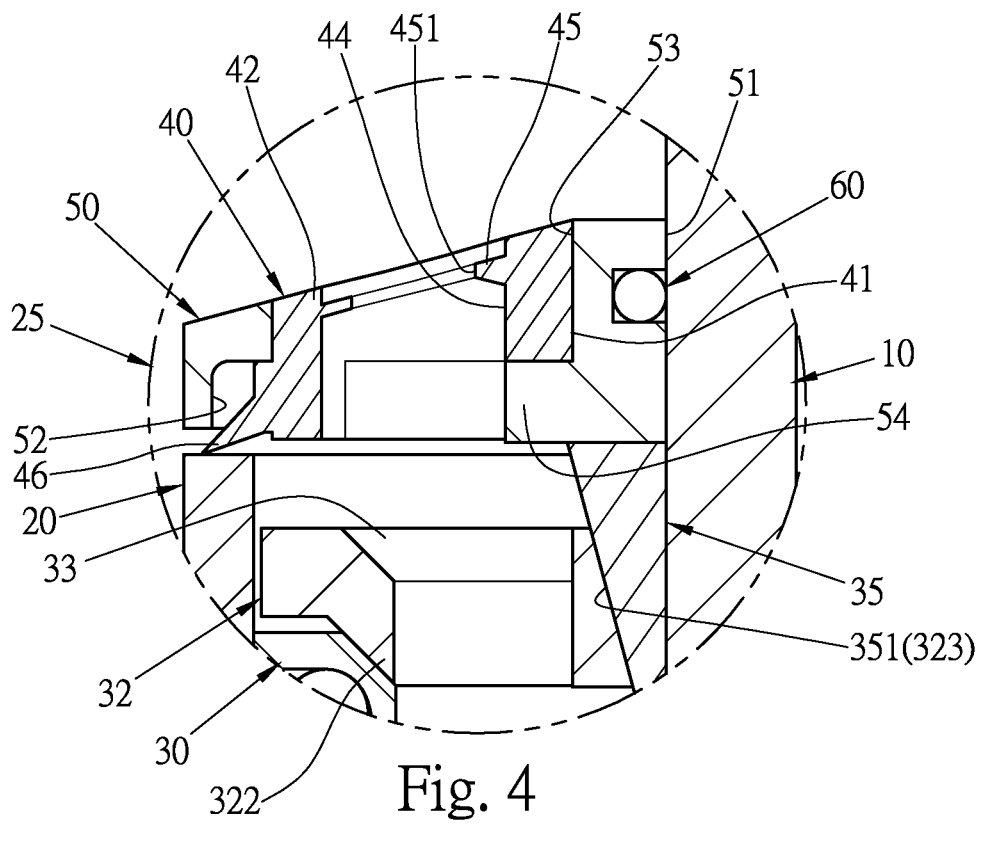
FIG. 4 is an enlarged cross sectional view to show the cover and the sealing member of the waterproof internal wiring structure for a bicycle headset of the present invention.

The sealing member 40 is a closed annular shape and has a central hole 41 through which the steer tube extends. Multiple protrusions 42 are formed on a top surface of the sealing member 40 and located around the second hole 41. As shown in FIGS. 3 and 4, each protrusion 42 includes multiple wire holes 44 which communicate with the elongated holes 33 of the seat 32. Each wire hole 44 has a resilient rib 45 extending radially from an inner periphery thereof so as to form a central inner hole 451. The resilient rib 45 is a thin and resilient rib which extends horizontally when not being bent. The diameter of the central inner hole 451 is smaller than that of the wire holes 44 and also smaller than that of a wire 70 so that the resilient rib 45 bends and contacts against the wire 70 passing through the central inner hole 451 to prevent water from entering the head tube 20.

The cover 50 is positioned at the upper end of the head tube 20 and mounted to the sealing member 40. The cover 50 has a third hole 51 and the steerer tube of front fork tube 10 passes through the third hole 51. The cover 50 includes a recessed area 52 formed to an underside thereof, and the sealing member 40 is located in the recessed area 52. The cover 50 includes multiple passages 53 with which the protrusions 42 of the sealing member 40 are engaged, such that the wire holes 44 are exposed. The passages 53 communicate with the wire holes 44 and the elongate holes 33.

Figure 7:
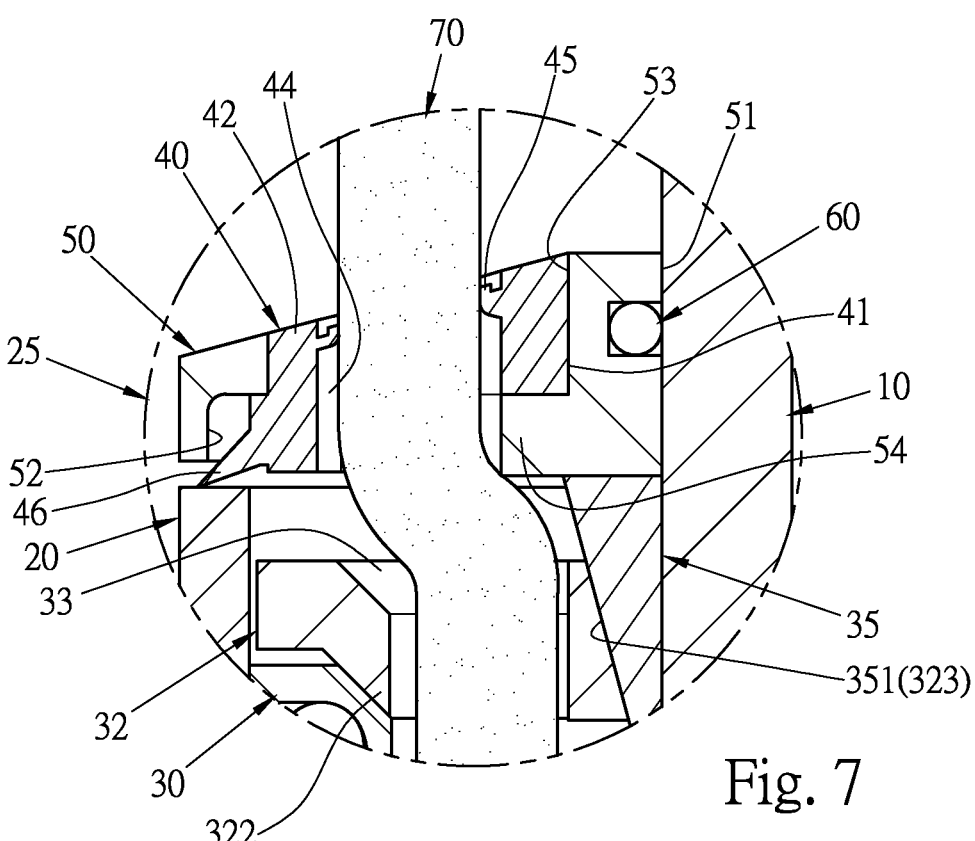
FIG. 7 is an enlarged cross sectional view to show that the wire passes through the sealing member and the cover of the waterproof internal wiring structure for a bicycle headset of the present invention.
Figure 5:
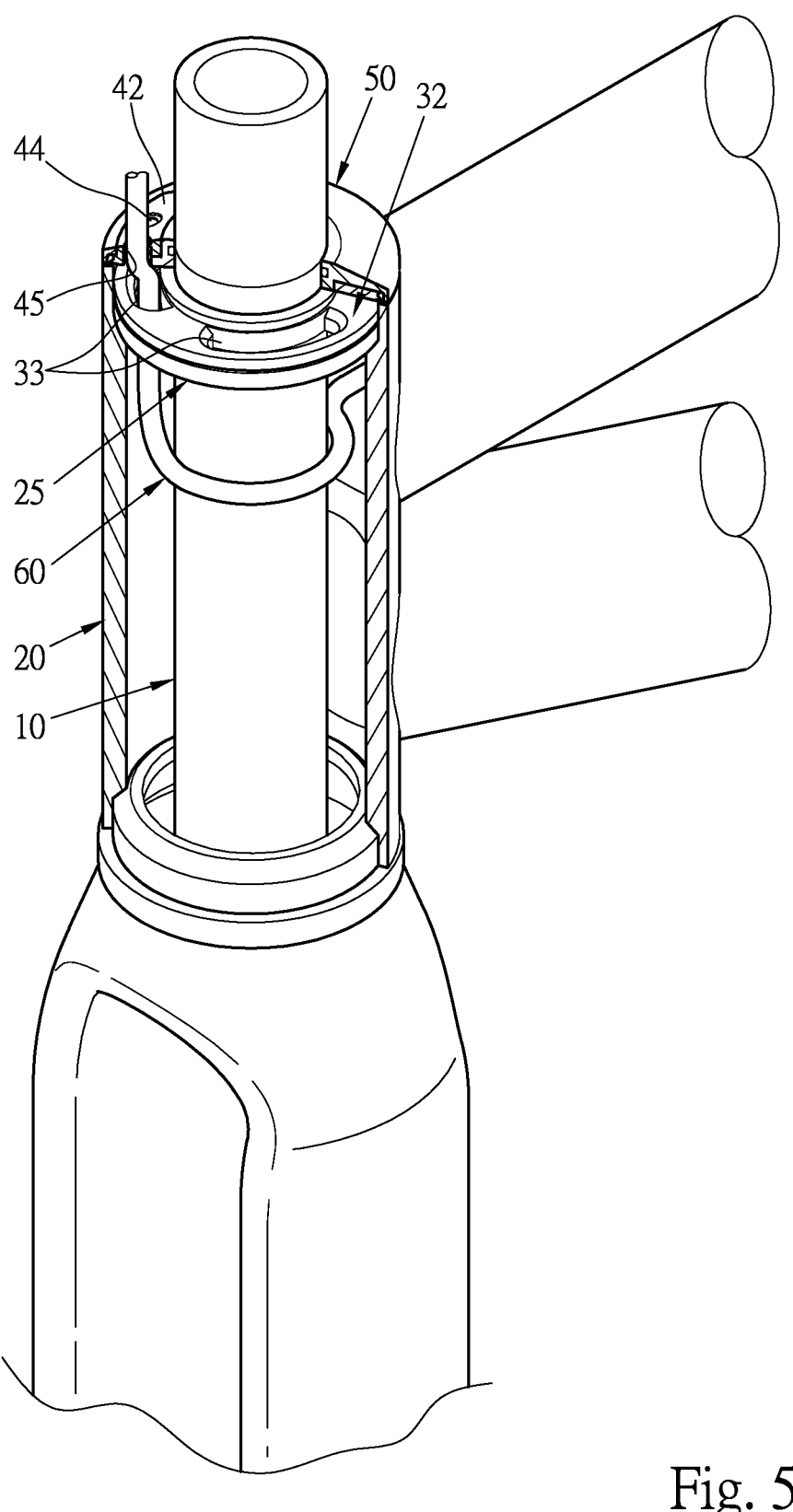
FIG. 5 shows a wire in the waterproof internal wiring structure for a bicycle headset of the present invention.
Figure 6:
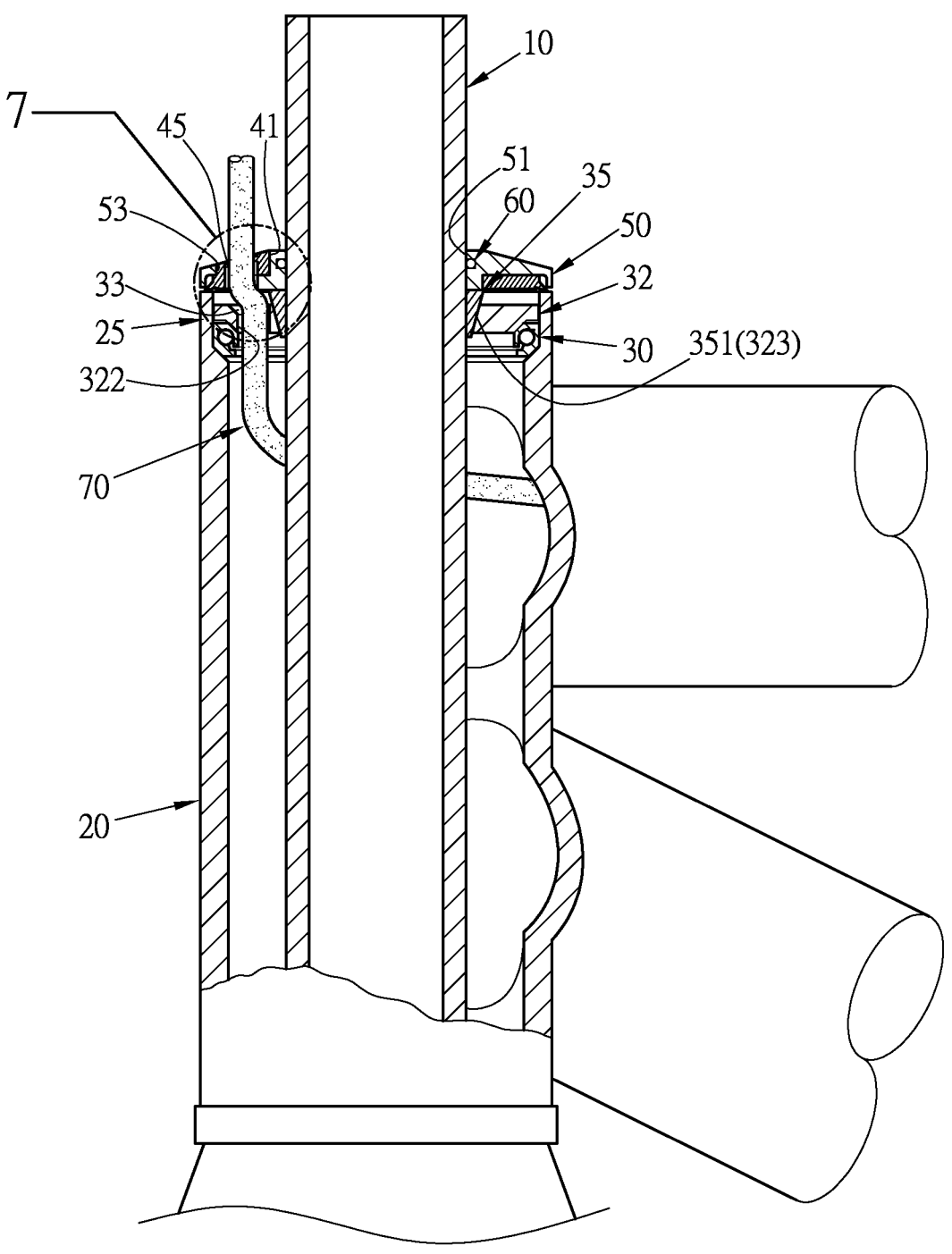
FIG. 6 is a cross sectional view to show the wire in the waterproof internal wiring structure for a bicycle headset of the present invention in FIG. 5.

As shown in FIGS. 5 to 7 which show the routing of the wire 70 within the head tube 20. The wire 70 extends towards the seat 32 through the elongate hole 33 and exits the head tube 20. Because the elongate hole 33 communicates with the wire hole 44 and the passage 53, the wire 70 passes through the elongate hole 33, the wire hole 44 and the passage 53, and extends out from the head tube 20 to be pulled to a designated position, such as the handlebar position.

Refer to FIGS. 3 and 4 and FIGS. 6 and 7, each of the passages 53 includes a tongue 54 extending from an inside thereof, and the tongue 54 is located close to the steerer tube of the front fork 10. A distal edge of the tongue 54 is aligned with an inner periphery of the wire hole 44 corresponding thereto to enhance waterproof feature. The sealing member 40 includes a skirt 46 extending outwardly and downwardly from an outer periphery thereof so as to prevent water from entering the upper headset assembly 25 from the cover 50 and the head tube 20.

Referring to FIGS. 2 to 7, an O-ring 60 is installed on the upper inner edge of the passage 51 of the cover 50, blocking water above the front fork 10, and preventing moisture from entering the upper headset assembly 25 between the front fork 10 and the cover 50.

Figure 8:
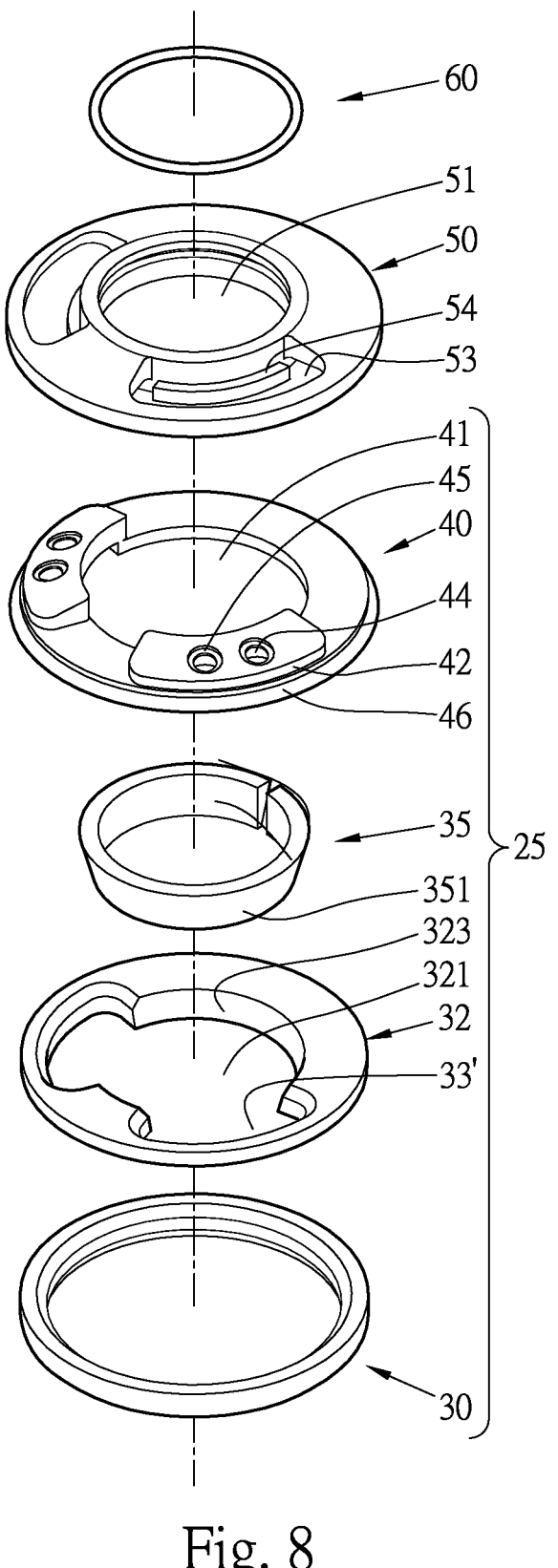
FIG. 8 is an exploded view to show the second embodiment of the waterproof internal wiring structure for a bicycle headset of the present invention.

FIG. 8 shows the second embodiment of the present invention, wherein the first conical surface 323 of the seat 32 has an opening so that the elongate hole 33' communicates with the first hole 321, and the first conical surface 323 of the seat 32 is not a circular surface.

The distinctive feature of the present invention is that when the wire 70 passes out of the wire hole 44, the wire 70 passes through the central inner hole 451 of the resilient rib 45 of the wire hole 44. Due to the smaller diameter of the central inner hole 451 compared to the diameter of the wire 70, when the wire 70 is pulled upward, it induces a movement to the resilient rib 45 which resiliently bends upwards, allowing the bent resilient rib 45 to adhere to the outer periphery of the wire 70 in a close and flexible manner. This fills and seals the gap between the outer periphery of the wire 70 and the wire hole 44, preventing mud and water from entering the channel space of the wire hole 44. Therefore, the invention exhibits excellent waterproof and dustproof properties.

While we have shown and described the embodiment in accordance with the present invention, it should be clear to those skilled in the art that further embodiments may be made without departing from the scope of the present invention.

What is claimed is:

1. A waterproof internal wiring structure for a bicycle headset, comprising:

an upper headset assembly (25) connected between an outer side of a steerer tube of a front fork (10) and an inner side of an upper end of a head tube (20), the upper headset assembly (25) comprising a bearing (30) located at the inner side of the upper end of the head tube (20), a seat (32) positioned on the bearing (30) and including a first hole (321), multiple elongated holes (33) defined through the seat (32) and located around the first hole (321), a C-shaped ring (35) located in the first hole (321), the steerer tube of the front fork tube (10) extending through the ring (35);

a sealing member (40) being a closed annular shape and having a central hole (41), multiple protrusions (42) formed on a top surface of the sealing member (40) and located around the second hole (41), each protrusion (42) including multiple wire holes (44) which communicate with the elongated holes (33) of the seat (32), each wire hole (44) having a resilient rib (45) extending radially from an inner periphery thereof and forming a central inner hole (451), a diameter of the central inner hole (451) being sized such that the resilient rib (45) matching with a wire (70) passing through the central inner hole (451) to prevent water from entering the head tube (20);

a cover (50) positioned at the upper end of the head tube (20) and mounted to the sealing member (40), the cover (50) having a third hole (51) and the steerer tube of front fork tube (10) passes through the third hole (51), the cover (50) including multiple passages (53) with which the protrusions (42) of the sealing member (40) are engaged, the passages (53) communicating with the wire holes (44) and the elongate holes (33), and an O-ring (60) engaged with the third central hole (51) of the cover (50) and contacting the steerer tube of the front fork (10).

2. The waterproof internal wiring structure for a bicycle headset as claimed in claim 1, wherein the head tube (20) includes a room (21) defined in the upper end thereof, the upper headset assembly (25) is located in the room (21).

3. The waterproof internal wiring structure for a bicycle headset as claimed in claim 1, wherein the seat (32) includes a lip (322) extending downward along a periphery of the first hole (321) of seat (32), the bearing (30) is mounted to the lip (322), an inner periphery of the first hole (321) and an inner periphery of the lip (322) form a first conical surface (323), an outer periphery of the retaining ring (35) includes a second conical surface (351) which is matched with the first conical surface (323).

4. The waterproof internal wiring structure for a bicycle headset as claimed in claim 1, wherein the cover (50) includes a recessed area (52), the sealing member (40) is located in the recessed area (52).

5. The waterproof internal wiring structure for a bicycle headset as claimed in claim 1, wherein each of the passages (53) includes a tongue (54) extending from an inside thereof, a distal edge of the tongue (54) is aligned with an inner periphery of the wire hole (44) corresponding thereto.

6. The waterproof internal wiring structure for a bicycle headset as claimed in claim 1, wherein the sealing member (40) includes a skirt (46) extending outwardly and downwardly from an outer periphery thereof so as to prevent water from entering the upper headset assembly (25) from the cover (50) and the head tube (20).

7. The waterproof internal wiring structure for a bicycle headset as claimed in claim 1, wherein the first conical surface (323) of the seat (32) has an opening so that the elongate hole (33') communicates with the first hole (321), and the first conical surface (323) of the seat (32) is not a circular surface.

* * * * *